No. 12,140. REISSUED AUG. 4, 1903.

H. STAHMER.

DISPLAY STAND.

APPLICATION FILED JUNE 18, 1903.

2 SHEETS—SHEET 1.

WITNESSES
E. H. Stanton
S. A. Griffin

INVENTOR
HENRY STAHMER
BY Paul & Paul
HIS ATTORNEYS

THE NORRIS PETERS CO., PHOTO-LITHO., WASHINGTON, D. C.

No. 12,140. REISSUED AUG. 4, 1903.

H. STAHMER.

DISPLAY STAND.

APPLICATION FILED JUNE 18, 1903.

2 SHEETS—SHEET 2.

WITNESSES

C. G. Stanton

S. V. Griffin

INVENTOR

HENRY STAHMER

BY Paul & Paul

HIS ATTORNEYS

THE NORRIS PETERS CO., PHOTO-LITHO., WASHINGTON, D. C.

No. 12,140. Reissued August 4, 1903.

UNITED STATES PATENT OFFICE.

HENRY STAHMER, OF OWATONNA, MINNESOTA.

DISPLAY-STAND.

SPECIFICATION forming part of Reissued Letters Patent No. 12,140, dated August 4, 1903.

Original No. 716,127, dated December 16, 1902. Application for reissue filed June 18, 1903. Serial No. 162,047.

*To all whom it may concern:*

Be it known that I, HENRY STAHMER, a citizen of the United States, residing at Owatonna, in the county of Steele and State of Minnesota, have invented certain new and useful Improvements in Display-Stands, of which the following is a specification.

My invention relates to improvements in display-stands particularly designed for exhibiting couches, although adaptable for displaying pictures or other articles, as occasion demands.

The primary object of my invention is to economize space on the store-floors and in display-windows by providing a display or exhibit stand whereon a couch can be placed on end and supported in a substantially upright position.

With this object in view my invention consists of a display-stand embodying novel features of construction and combination of parts, substantially as disclosed herein.

Figure 1:
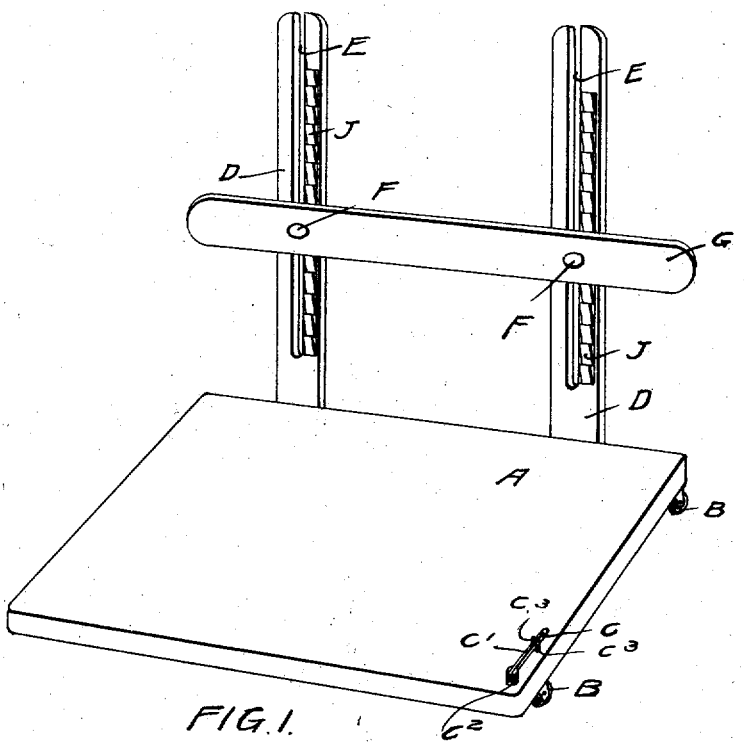
Figure 2:
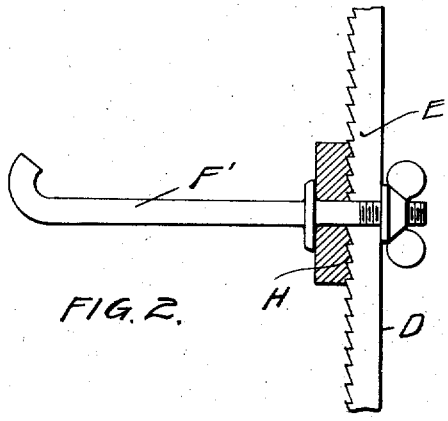
Figure 3:
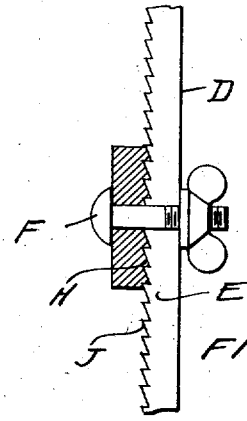
Figure 4:
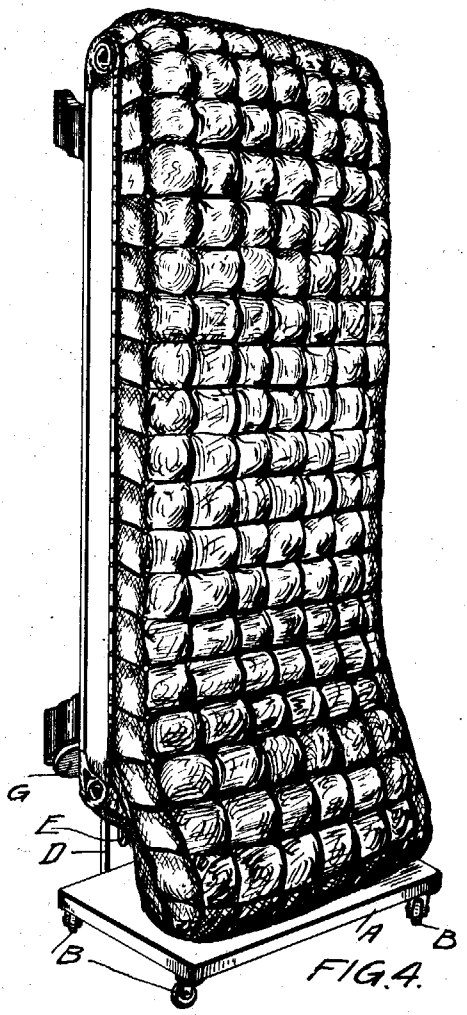
Figure 5:
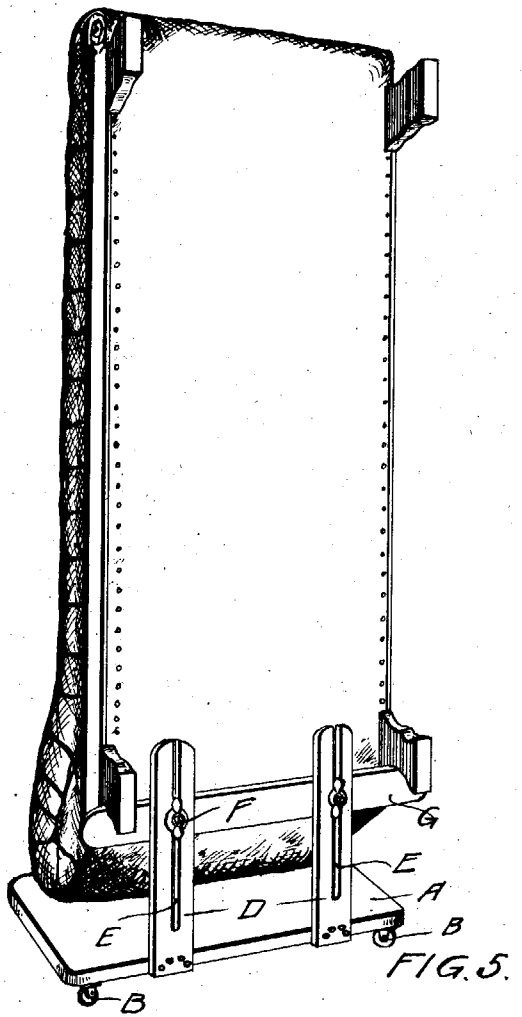

Figure 1 represents a perspective view of my stand. Fig. 2 represents a detail view, and Fig. 3 represents a view of a modified construction of my invention. Fig. 4 is a perspective view looking toward the front of the couch, showing it in its position for display on the stand. Fig. 5 is a similar view looking toward the bottom of the couch and the rear of the stand.

Referring by letter to the drawings, A designates a platform corresponding, substantially, in shape and size to the end of a couch and mounted upon casters B, one of which may be provided with a catch or securing device C for the purpose of preventing accidental movement of the platform, the catch or holding device consisting of a lever C′, having one end connected to the upwardly-extended portion $C^2$ of the caster and the other end held between the legs $C^3$, which thus holds the caster rigid when desired. From one side of the platform rises a pair of standards D, which are formed with slots E to receive the clamping-bolts F, said bolts serving to secure the horizontal supporting-bar G at any desired vertical adjustment on the standards, and upon the rear of the bar are teeth H, which engage with racks J on the standards and securely retain the bar at any desired adjustment.

If desired, the clamping-bolts F may be provided with arms F′ to form rests for a picture-frame or like article, as will be understood.

To use the device, the couch is placed on end upon the platform in a substantially vertical position with its lower end legs overhanging the cross-bar, which has previously been properly adjusted to engage the said legs and frame and partially support and steady the couch in its upright position.

It will be seen that my stand serves its function as an exhibition-stand in a perfect manner, also that it acts as a truck by means of which the articles can be readily moved, also that it can be adjusted to suit circumstances, and possesses the features of compactness, attractiveness, cheapness, and efficiency to commend it as fully practical in every particular.

I claim as my invention—

1. The display-stand herein shown and described, consisting of a horizontal platform, a pair of slotted standards rising from one side of the platform, a rack carried by each standard, a horizontal supporting-bar having teeth to engage the racks of the standards, bolts passing through the bar and standards, and nuts on said bolts for clamping the teeth of the bar and standards to hold the supporting-bar at the proper adjustment.

2. A display-stand, consisting of a platform, casters to permit easy moving of said platform, slotted standards rising from said platform, rack-bars carried by the standards, a supporting-bar having teeth to engage said rack-bars, and clamping devices for securing the supporting-bar at any adjustment on the standards.

3. A display-stand, comprising a horizontal platform, a pair of slotted standards rising from one side of said platform, a horizontal bar, bolts passing through said bar and the slots in said standards, and nuts on said bolts for clamping said bar and standards to hold the former at the proper adjustment.

4. A display-stand, comprising a platform having a top of sufficient area to receive a couch placed upon end thereon, standards rising from said platform and provided at their upper ends with slots extending vertically therein, a horizontal bar supported by said standards and arranged to engage the legs at the lower end of the couch, and clamping devices extending through said slots and securing said bar to said standards and permitting its vertical adjustment thereon.

5. A display-stand, comprising a horizontal platform adapted to support a couch placed upon end thereon, a pair of standards rising from one side of said platform, and a horizontal bar adjustably secured upon said standards.

6. A couch-display stand, comprising a flat-topped platform of greater dimensions than the end of a couch and adapted to receive and support a couch placed upon end thereon, standards rising from the rear edge of said platform and a horizontal bar connecting said standards and arranged to engage the lower legs of the couch to aid in supporting it in an upright position.

In witness whereof I have hereunto set my hand this 8th day of June, 1903.

HENRY STAHMER.

In presence of—
RICHARD PAUL,
S. V. GRIFFIN.